US009255555B2

(12) United States Patent
Cho

(10) Patent No.: US 9,255,555 B2
(45) Date of Patent: Feb. 9, 2016

(54) AIR CLEANER FOR VEHICLE

(71) Applicant: Leehan Corporation, Gyeonggi-do (KR)

(72) Inventor: Cheongyong Cho, Gyeonggi-do (KR)

(73) Assignee: Leehan Corporation, Suwon-si (KR)

( * ) Notice: Subject to any disclaimer, the term of this patent is extended or adjusted under 35 U.S.C. 154(b) by 41 days.

(21) Appl. No.: 14/087,327

(22) Filed: Nov. 22, 2013

(65) Prior Publication Data

US 2015/0007530 A1 Jan. 8, 2015

(30) Foreign Application Priority Data

Jul. 2, 2013 (KR) ........................ 10-2013-0077430

(51) Int. Cl.
*B01D 46/00* (2006.01)
*F02M 35/02* (2006.01)
*F02M 35/024* (2006.01)

(52) U.S. Cl.
CPC ....... *F02M 35/0203* (2013.01); *F02M 35/0245* (2013.01); *F02M 35/02416* (2013.01); *F02M 35/02491* (2013.01)

(58) Field of Classification Search
CPC ........... B01D 46/0005; B01D 46/0006; B01D 46/521; B01D 2265/024; B01D 2271/02
USPC ................ 55/492, 502, 503, 504, 493, 385.3; 123/198 E
See application file for complete search history.

(56) References Cited

U.S. PATENT DOCUMENTS

| | | | | |
|---|---|---|---|---|
| 6,174,343 | B1 * | 1/2001 | Bloomer | 55/385.3 |
| 6,217,627 | B1 * | 4/2001 | Vyskocil et al. | 55/492 |
| 2004/0173097 | A1 * | 9/2004 | Engelland et al. | 95/273 |
| 2005/0204713 | A1 * | 9/2005 | Wu et al. | 55/496 |

(Continued)

FOREIGN PATENT DOCUMENTS

| | | | |
|---|---|---|---|
| JP | 8-121272 | A | 5/1996 |
| JP | 2009-213604 | A | 9/2009 |
| JP | 2011-153613 | A | 8/2011 |

(Continued)

OTHER PUBLICATIONS

Japanese Office Action for corresponding Application No. 2013-227979 issued on Dec. 9, 2014.

*Primary Examiner* — Duane Smith
*Assistant Examiner* — Minh-Chau Pham
(74) *Attorney, Agent, or Firm* — Sughrue Mion, PLLC

(57) ABSTRACT

Disclosed is an air cleaner for a vehicle. The air cleaner for a vehicle according to the exemplary embodiment includes: a body portion which has an air inlet formed at one side of the body portion so as to suck air; a cover portion which is coupled to an upper portion of the body portion and has an air outlet formed at one side of the cover portion; an element which is inserted into or withdrawn from the interior of the body portion and the cover portion through a receiving opening that is formed at one side of the body portion and the cover portion; a height adjustment handle which is rotatably coupled to a lower portion of the element and allows the element to be raised upward and lowered downward by a rotation of the height adjustment handle; and an element cover which is coupled to one side of the cover portion so as to prevent the element from being moved away from the receiving opening, and has a locking member which is provided at one surface of the element cover and has elastic force.

8 Claims, 8 Drawing Sheets

(56) References Cited

U.S. PATENT DOCUMENTS

| | | | | |
|---|---|---|---|---|
| 2015/0040527 | A1 * | 2/2015 | Cho et al. | 55/481 |
| 2015/0052859 | A1 * | 2/2015 | Cho et al. | 55/357 |

FOREIGN PATENT DOCUMENTS

| | | | |
|---|---|---|---|
| JP | 2012-184723 | A | 9/2012 |
| KR | 10-1326500 | A | 6/2013 |

* cited by examiner

100

AIR CLEANER FOR VEHICLE

CROSS-REFERENCE TO RELATED APPLICATION

This application claims priority to and the benefit of Korean Patent Application No. 10-2013-0077430 filed in the Korean Intellectual Property Office on Jul. 2, 2013, the entire contents of which are incorporated herein by reference.

TECHNICAL FIELD

The present disclosure relates to an air cleaner for a vehicle, and more particularly, to an air cleaner for a vehicle capable of allowing an element, which is installed in the air cleaner, to be assembled like a drawer structure, and preventing the element from being shaken by flow pressure of air that flows in the air cleaner.

BACKGROUND OF THE DISCLOSURE

In general, a vehicle generates power by mixing fuel and air and combusting the mixture of fuel and air. That is, fuel stored in a fuel tank of a vehicle passes through various types of fuel supply devices, is mixed with air introduced from the outside, and then is injected into a cylinder of an engine, and at the same time, the engine is operated by repeating intake, compression, combustion, and exhaust strokes, and thereby, the vehicle obtains power.

As described above, a predetermined amount of air is needed to drive the engine, and air is supplied from the outside of the vehicle. That is, air flows into an air cleaner housing from the outside of the vehicle, flows toward an intake manifold through an air intake hose that is connected to the air cleaner housing, and then is supplied into the engine.

That is, the intake manifold is formed so that air sucked from the outside passes through a filter and then flows toward the opposite side via the air cleaner, and purified air is supplied into the engine after filtering dust and impurities included in the air using the filter, thereby supplying air required for combustion.

FIG. 1 is a view schematically illustrating an air cleaner 1 in the related art. Referring to FIG. 1, the air cleaner 1 in the related art includes a body portion 10 which has an air inlet 12 formed at one side of the body portion 10, a cover portion 20 which is coupled to an upper portion of the body portion 10 and has an outlet 22 formed at one side of the cover portion 20, an element 30 which is interposed between the body portion 10 and the cover portion 20.

In the air cleaner 1 having the aforementioned configuration, air flows into the air cleaner 1 through the air inlet 12 formed in the body portion 10, the air flowing into the air cleaner 1 passes through the element 30 so as to filter impurities, and thereafter, the air is supplied into the engine through the outlet 22 formed in the cover portion 20.

There is a problem in that when the air cleaner 1 is used for a long period of time, a large amount of impurities is attached to the element 30, and thereby, the air cleaner 1 does not properly perform a filtering function. Therefore, in order to filter air, the element 30, which is installed in the body portion 10 and the cover portion 20, needs to be replaced by a new element after a predetermined time has passed.

However, because the body portion 10 and the cover portion 20 of the air cleaner 1 in the related art are coupled to each other by bolts, the bolts, which fix four corners of the body portion 10 and the cover portion 20, needs to be removed to replace the element 30, and therefore, there are problems in that it is inconvenient to replace the element 30, and it takes a long time to replace the element 30.

In addition, because in the air cleaner 1 in the related art, the element 30 is positioned such that the element 30 merely lies on an upper side of the body portion 10, there are problems in that when air flows in from a lower portion of the element 30, that is, through the air inlet 12 of the body portion 10, the element 30 is shaken by flow pressure of the air, and the body portion 10 and the cover portion 20 collide with each other, which causes vibrating noise.

Accordingly, in order to resolve the aforementioned problem in the related art, the present applicant filed Korean Patent Laid-Open Application No. 10-2013-0061599, entitled “Air Cleaner for Vehicle”. However, the aforementioned technology has a merit in that the air cleaner 1 is mounted in an air cleaner housing so as to be detachable like a drawer structure such that the air cleaner 1 may be easily and conveniently replaced, but has a problem in that because an element is not securely fixed when flow pressure occurs in the housing, which causes vibrating noise.

Therefore, the present applicant has studied an air cleaner for a vehicle, which may resolve the aforementioned problems in the related art.

LITERATURE OF RELATED ART

Patent Literature (Patent Literature 0001) Korean Patent Laid-Open Application No. 10-2013-0061599

SUMMARY

The present disclosure has been made in an effort to provide an air cleaner for a vehicle in which an element installed in an air cleaner may be easily and conveniently replaced, an element comes into complete contact with a body portion and a cover portion of the air cleaner so as to block vibrating noise from occurring by preventing the element from being shaken even when flow pressure occurs in the air cleaner.

The present disclosure has also been made in an effort to provide an air cleaner for a vehicle in which a body portion and a cover portion of an air cleaner may be securely coupled to each other.

An exemplary embodiment of the present disclosure provides an air cleaner for a vehicle including: a body portion which has an air inlet formed at one side of the body portion so as to suck air; a cover portion which is coupled to an upper portion of the body portion and has an air outlet formed at one side of the cover portion; an element which is inserted into or withdrawn from the interior of the body portion and the cover portion through a receiving opening that is formed at one side of the body portion and the cover portion; a height adjustment handle which is rotatably coupled to a lower portion of the element and allows the element to be raised upward and lowered downward by a rotation of the height adjustment handle; and an element cover which is coupled to one side of the cover portion so as to prevent the element from being moved away from the receiving opening, and has a locking member which is provided at one surface of the element cover and has elastic force.

According to the exemplary embodiment of the present disclosure, the element may be mounted in the air cleaner so as to be detachable like a drawer structure, such that the element may be easily and conveniently replaced. In addition, an upper surface of the element and the cover portion may come into complete contact with each other by providing a close contact means at a lower portion of a flange of the element, thereby minimizing air leakage, and preventing vibrating noise from occurring.

The element cover, which is provided to insert and withdraw the element, may be easily and conveniently engaged with or separated from the body portion and the cover portion, thereby reducing the time required to replace the element.

DETAILED DESCRIPTION OF THE EMBODIMENTS

Hereinafter, an air cleaner for a vehicle according to exemplary embodiments of the present disclosure will be described in more detail with reference to the drawings.

Figure 1:
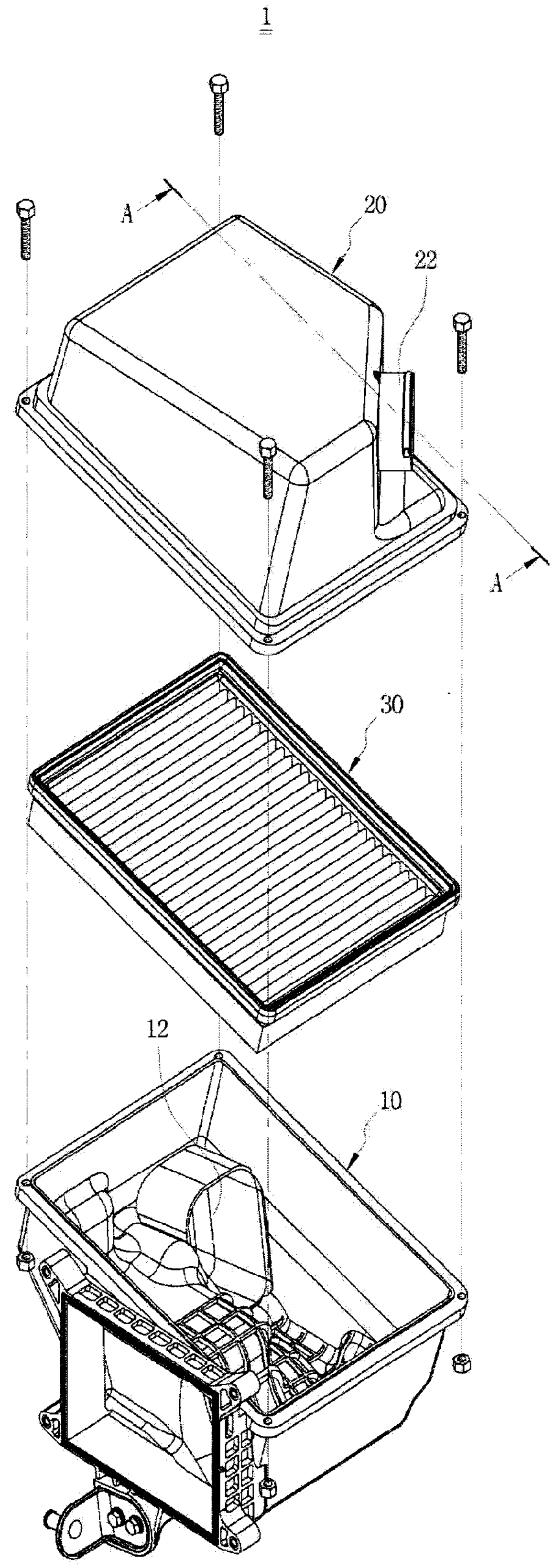
Fig. 1 RELATED ART
FIG. 1 is a view schematically illustrating a drawer type air cleaner for a vehicle in the related art.
Figure 2:
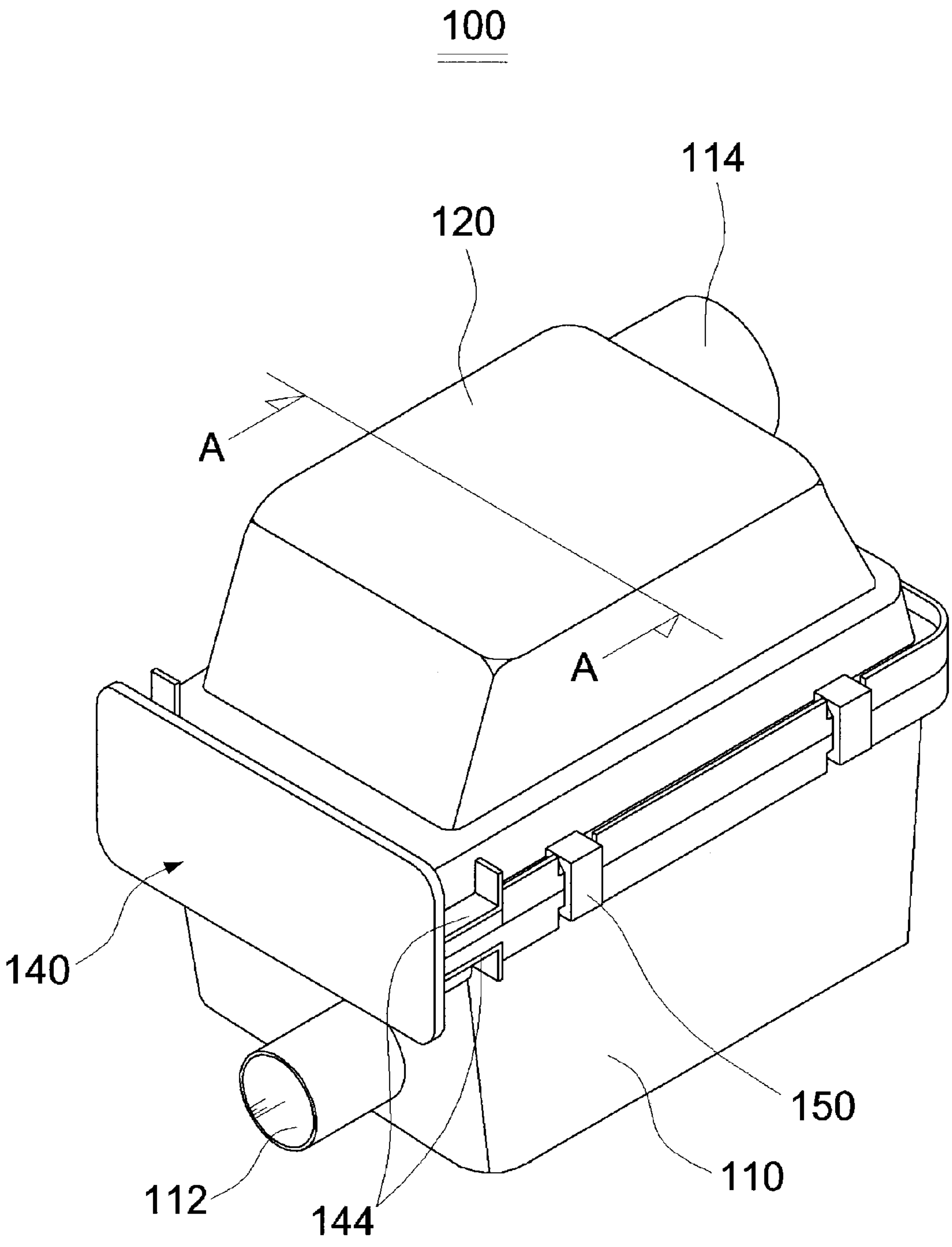
FIG. 2 is a view schematically illustrating an air cleaner for a vehicle according to an exemplary embodiment of the present disclosure.
Figure 3:
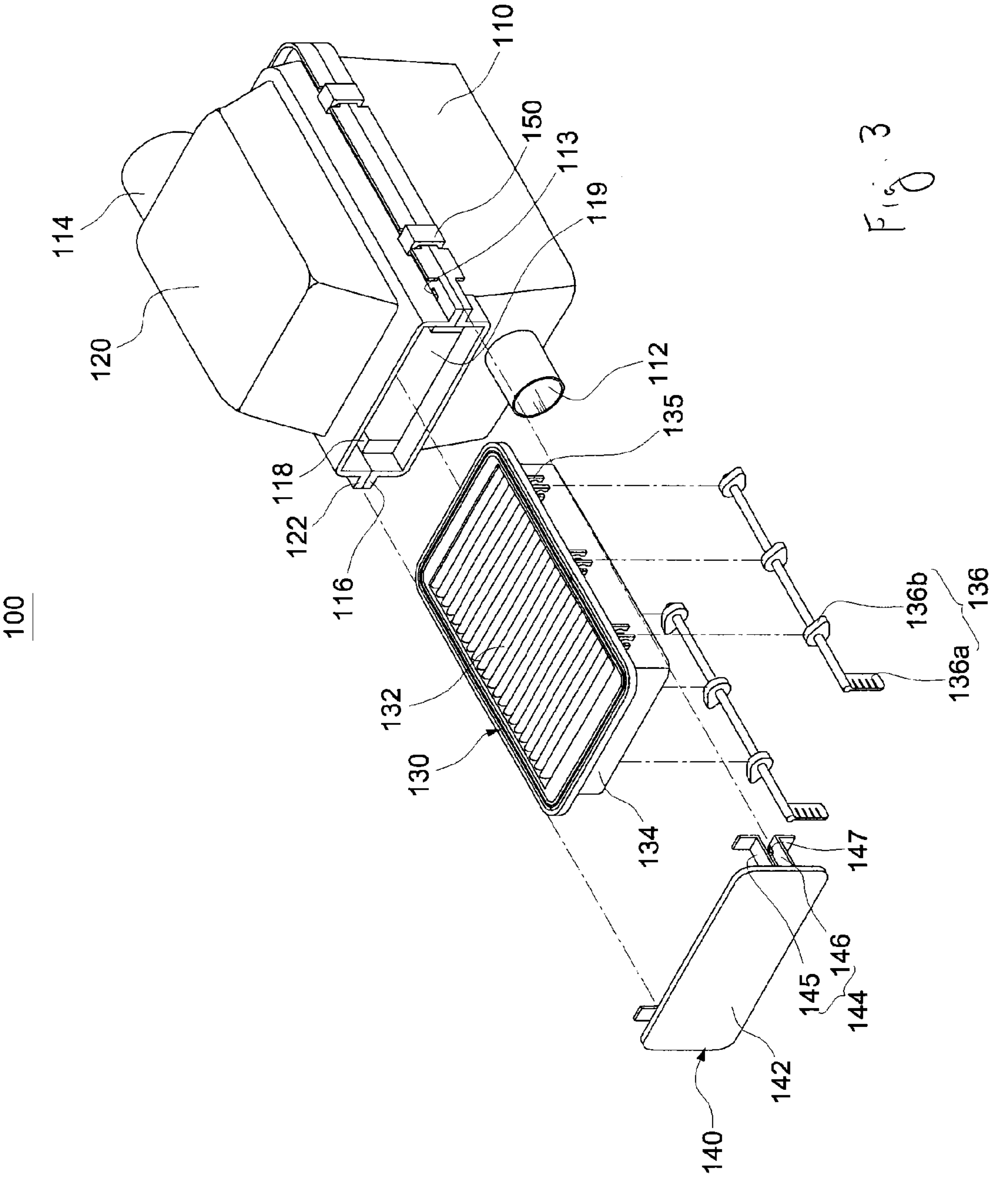
FIG. 3 is an exploded perspective view of the air cleaner for a vehicle according to the exemplary embodiment of the present disclosure.

FIG. 2 is a view schematically illustrating an air cleaner for a vehicle according to an exemplary embodiment of the present disclosure, and FIG. 3 is an exploded perspective view of the air cleaner for a vehicle according to the exemplary embodiment of the present disclosure.

Referring to FIGS. 2 and 3, an air cleaner 100 for a vehicle according to an exemplary embodiment of the present disclosure may include a body portion 110 which has an air inlet 112 formed at one side of the body portion 110 so as to suck air, a cover portion 120 which is coupled to an upper portion of the body portion 110 and has an air outlet 114 formed at one side of the cover portion 120, an element 130 which is installed in the body portion 110 and the cover portion 120 so as to filter air, and an element cover 140 which is installed at one side of the cover portion 120.

Specifically, as illustrated in the drawings, the body portion 110 may be formed in a container shape having a receiving space therein, may be formed to be opened upward, and may have the air inlet 112 formed at one side of the body portion 110 so as to introduce air from the outside.

In addition, a seating protrusion 116 may be provided to be laterally extended along an outer rim disposed at an opened upper end of the body portion 110, and supporting protrusions 118 may be formed in the body portion 110 at both sides in a width direction of the body portion 110 along the rim so as to face each other.

The cover portion 120 may be coupled to an opened upper side of the body portion 110, may be formed in a container shape having a receiving space therein similarly to the body portion 110, may be formed to be opened downward, and may have the air outlet 114 formed at one side of the cover portion 120 so as to discharge the air flowing in through the air inlet 112 to the outside.

In addition, a coupling protrusion 122, which is laterally extended along an outer rim so as to be seated on the seating protrusion 116 formed on the body portion 110, may be formed on an opened lower end of the cover portion 120.

Here, a receiving opening 119 through which the element 130 for filtering air when the body portion 110 and the cover portion 120 come into contact with each other is inserted or withdrawn may be formed at one side of a portion where the seating protrusion 116 of the body portion 110 and the coupling protrusion 122 of the cover portion 120 come into contact with each other.

That is, the receiving opening 119 is formed in a shape corresponding to the element 130, and may be formed so that the element 130 is inserted into or withdrawn from the interior of the body portion 110 and the cover portion 120 through the receiving opening like a drawer structure.

Meanwhile, as the element 130, there are various types of elements, such a dry type element that uses a filter paper or a synthetic fiber, a wet type element that uses water or like and is used in an engine, and a combination type element that combines the dry type element and the wet type element, but the dry type element is used in the exemplary embodiment of the present disclosure. The element 130 filters impurities when air introduced in the air cleaner 100 passes through the element 130 by negative pressure in the engine, and may be formed in a rectangular shape.

Specifically, the element 130 may include a filter paper 132 which filters impurities included in air, a rim member 134 which is formed at an upper side of the filter paper 132, is formed to enclose an outer circumferential surface of the filter paper 132, and prevents a shape of the filter paper 132 from being deformed by flow pressure of air, and a height adjustment handle 136 which is coupled to the rim member 134 so that the element 130 comes into close contact with an upper surface of the receiving opening of the cover portion 120.

The filter paper 132 is made of a synthetic fiber, and is formed to be stacked in a multi-layered form so as to have a sufficient filtering area.

In addition, the rim member 134, which is formed to enclose the outer circumferential surface of the filter paper 132, is formed as a rectangular frame, and a flange may be formed on an upper side of the rim member 134 so as to be laterally and protrudingly extended.

Here, in the exemplary embodiment of the present disclosure, a plurality of fixing brackets 135 may protrude downward at a lower side of the flange so that the height adjustment handle 136 is rotatably coupled to the fixing bracket 135.

One end of each of the plurality of fixing brackets 135 is integrally fixed and coupled to the flange, and the height adjustment handle 136 is rotatably fitted with the other end of each of the plurality of fixing brackets 135. A pair of fixing brackets 135 is spaced apart from each other at a predetermined interval, and a plurality of pairs of fixing brackets 135 is formed along a longitudinal direction of the flange.

In addition, the height adjustment handle 136 is formed in a shaft shape, a handle portion **136*a* is provided on one end of the height adjustment handle 136 so that a user may grip and rotate the handle portion 136*a*, and a plurality of eccentric cams 136*b*** may be formed on the shaft.

The eccentric cam 136*b* has a diameter larger than a diameter of the shaft, and one side of the eccentric cam 136*b* is extended in an egg shape. When the user grips and rotates the handle portion 136*a* of the height adjustment handle 136, a protruding portion of the eccentric cam 136*b* is directed downward, and thereby, a height of the element 130 may be adjusted while the eccentric cam 136*b* is supported on the supporting protrusion 118 formed in the body portion 110.

Figure 4:
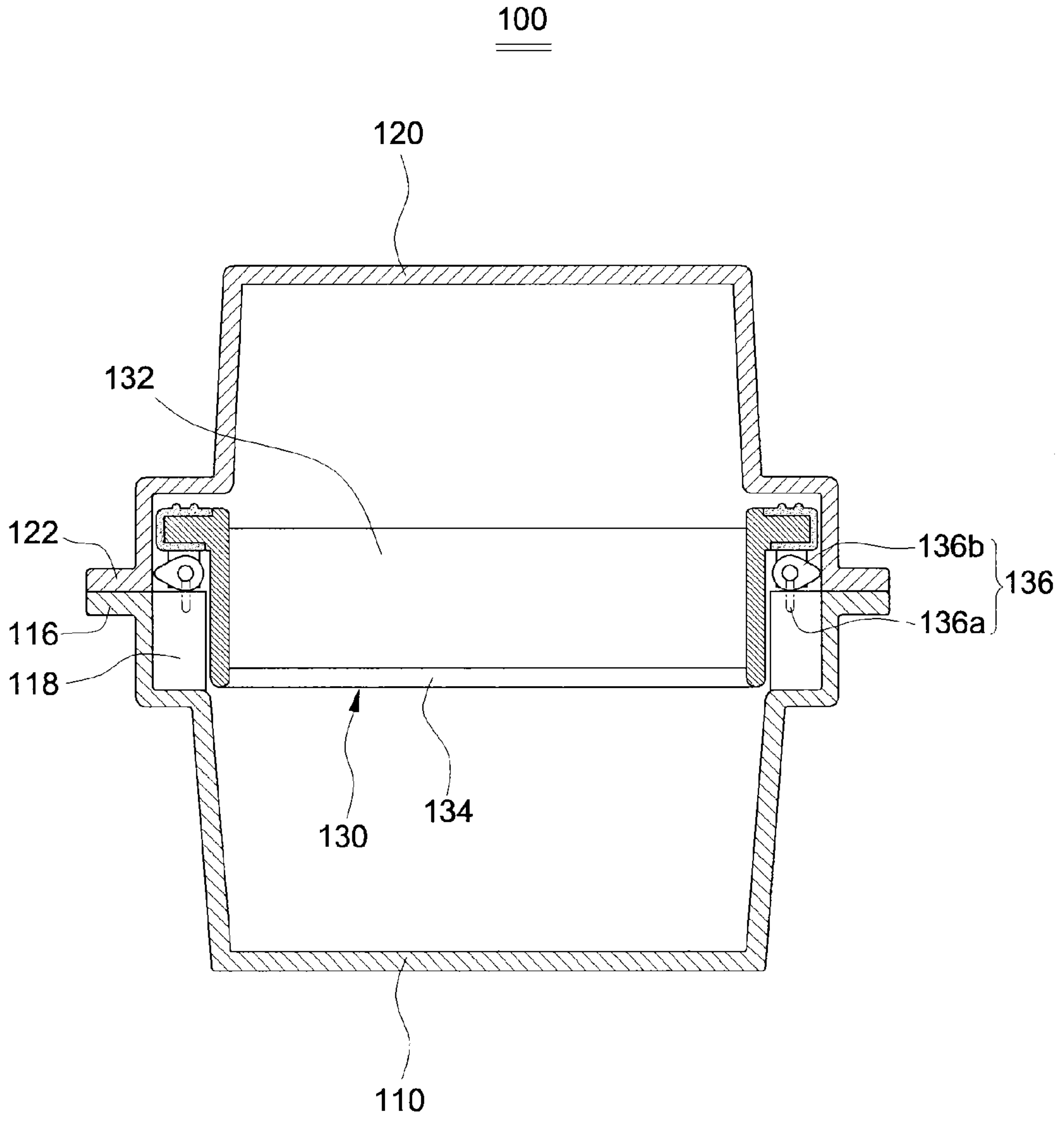
FIG. 4 is a cross-sectional view taken along line A-A of the air cleaner for a vehicle according to the exemplary embodiment of the present disclosure.
Figure 5:
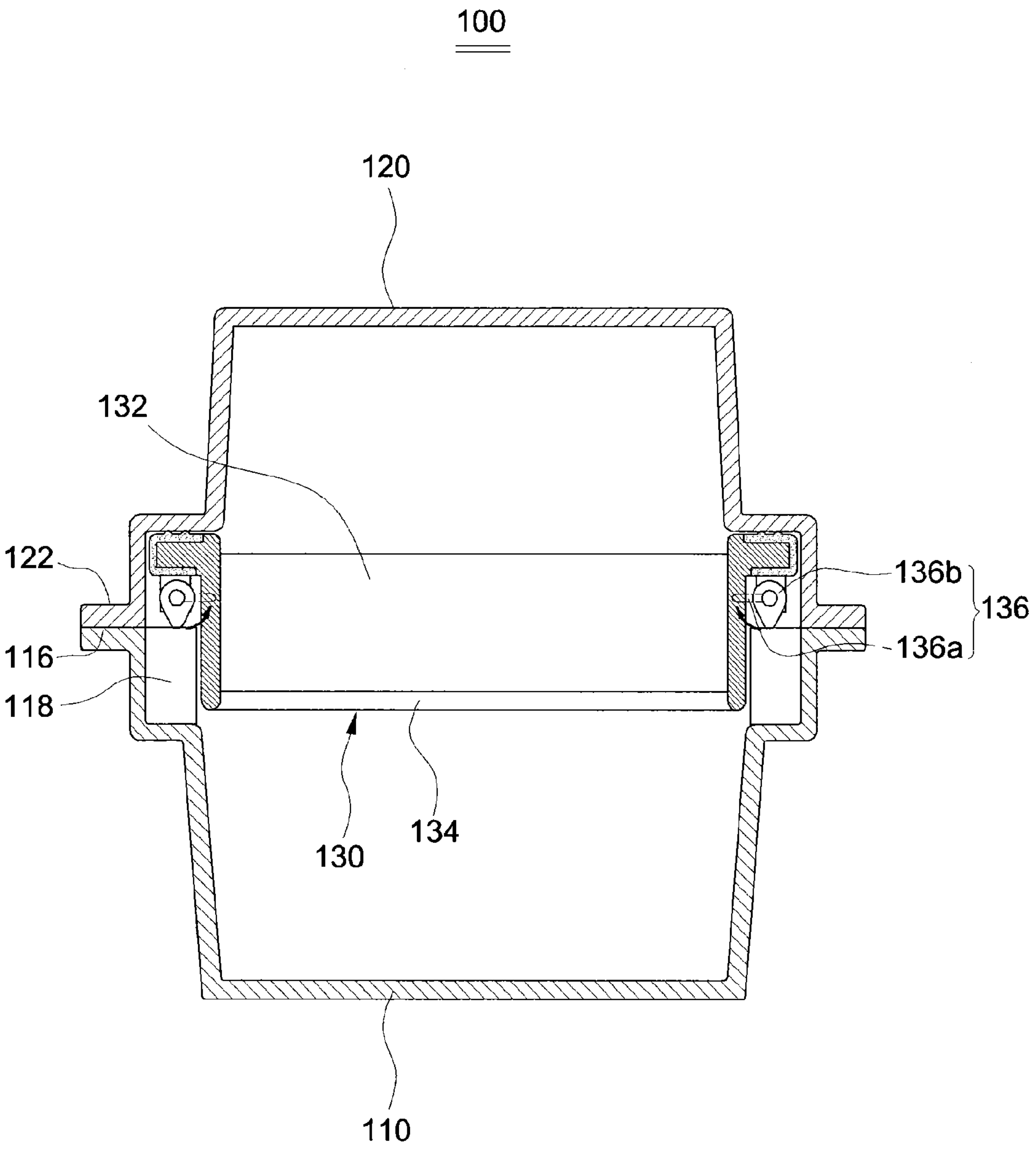
FIG. 5 is a view schematically illustrating an operational state of the air cleaner for a vehicle illustrated in FIG. 4.

That is, as illustrated in FIG. 4, when the height adjustment handle 136 is initially inserted into the receiving opening 119, which is formed between the body portion 110 and the cover portion 120, in a state in which the height adjustment handle 136 is coupled to a lower portion of the flange of the element 130, the height adjustment handle 136 is rotated so that a protruding and extending portion of the eccentric cam 136*b* is horizontally directed. As illustrated in FIG. 5, after the element 130 is completely inserted, the handle portion 136*a* is rotated so that the protruding and extending portion of the eccentric cam 136*b* is directed downward. Therefore, the element 130 is raised upward by the supporting protrusion 118 formed in the body portion 110, and the element 130 comes into close contact with an upper side of the receiving opening 119 of the cover portion 120.

Therefore, because the element 130 comes into close contact with the body portion 110 and the cover portion 120 of the air cleaner, the element 130 is not shaken by flow pressure of air that flows in the air cleaner 100, and thereby, vibrating noise does not occur.

In addition, because the element 130 comes into close contact with the body portion 110 and the cover portion 120, air leakage may be prevented, thereby blocking leaking noise due to air leakage from occurring.

Moreover, the element 130 may easily and conveniently come into close contact with the body portion 110 and the cover portion 120 by a simple operation of rotating the height adjustment handle 136.

Meanwhile, the element cover 140 may be provided on an outer side of the receiving opening 119 into which the element 130 is inserted.

Figure 6:
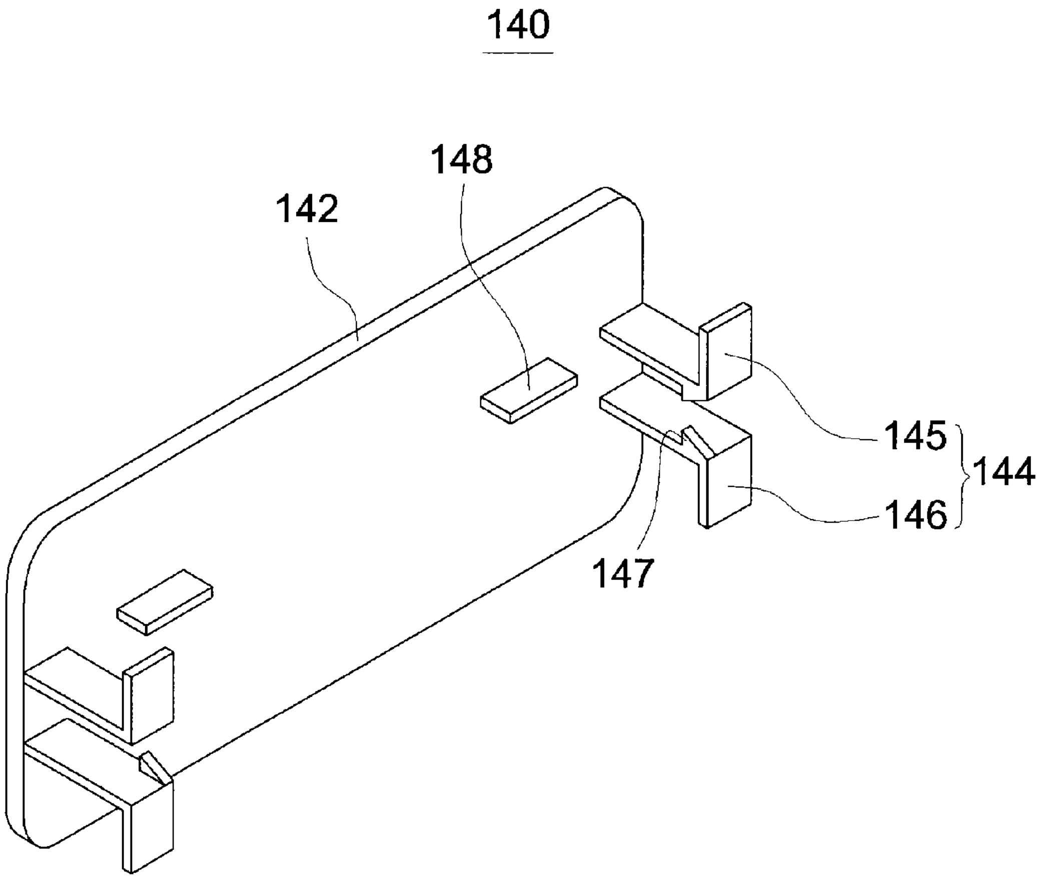
FIG. 6 is a view schematically illustrating an element cover used in the air cleaner for a vehicle according to the exemplary embodiment of the present disclosure.
Figure 7:
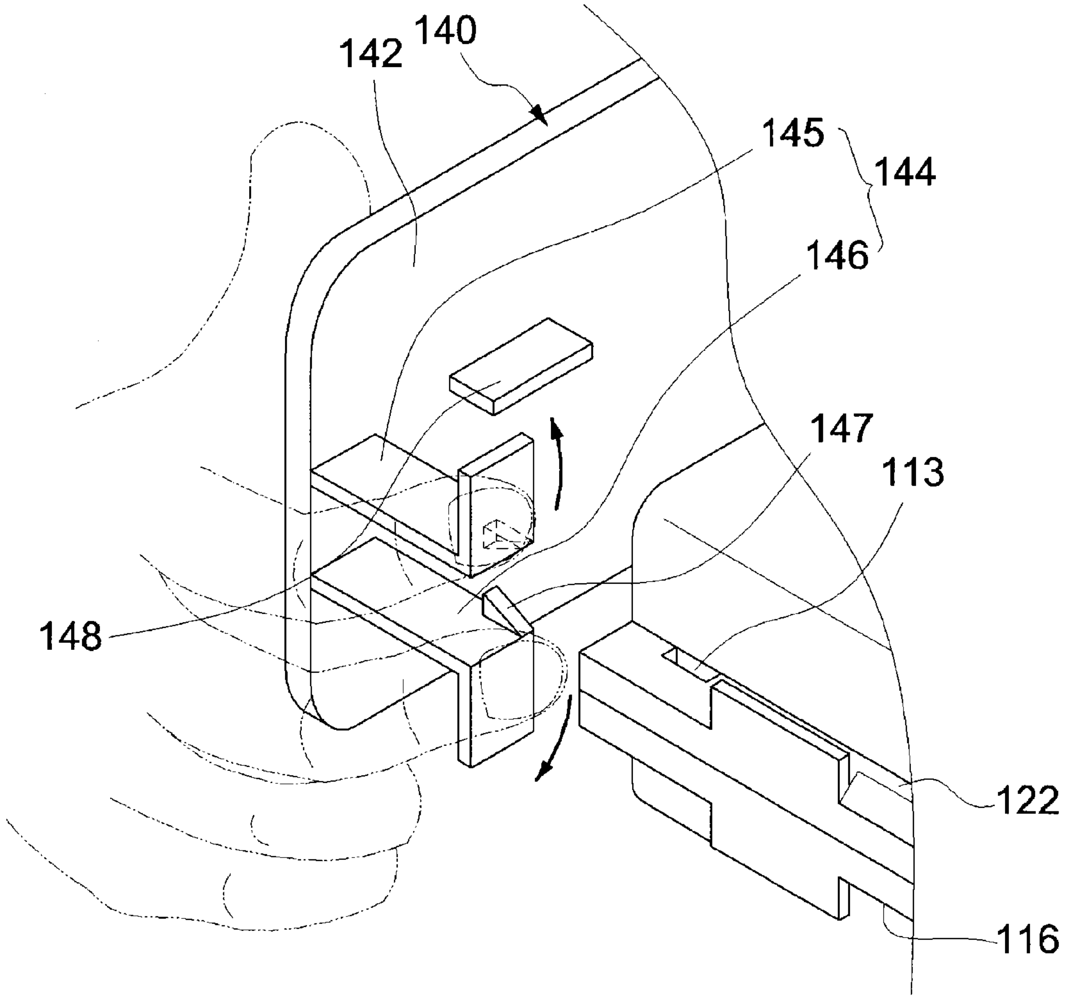
FIG. 7 is a view schematically illustrating a state in which the element cover of the air cleaner for a vehicle according to the exemplary embodiment of the present disclosure is coupled or separated.

As illustrated in FIGS. 6 and 7, the element cover 140 may include a cover member 142 which is formed in a plate shape and prevents the element 130, which is inserted into the receiving opening 119, from being exposed to the outside, and locking members 144 which protrude on both lateral sides of the cover member 142 and are fixed and coupled to the body portion 110 and the cover portion 120.

Specifically, the cover member 142 is formed to be wider than a diameter of the receiving opening 119 so as to completely cover the receiving opening 119, and the locking members 144 having elastic force may protrude on one surface of the cover member 142.

The locking members 144 serve to fix the cover member 142 by being partially fitted into restriction grooves 113 that are formed, respectively, in the seating protrusion 116 of the body portion 110 and the coupling protrusion 122 of the cover portion 120, and may be formed on both sides of one surface of the cover member 142.

That is, the locking members 144 may include: a first locking member 145 which protrudes on each of both side surfaces of the cover member 142, and has one end that is integrally formed with the locking member 144, and the other end that is bent upward; a second locking member 146 which has one end that is integrally formed with the cover member 142 so as to be spaced apart from the first locking member 145 at a predetermined distance, and the other end that is bent downward; and restriction protrusions 147 which are formed on the first locking member 145 and the second locking member 146, which are integrally formed with the cover member 142, so as to face each other.

Therefore, as illustrated in FIG. 7, when the user presses the first locking member 145 using an index finger, and presses the second locking member 146 using a middle finger, in a direction in which the cover member 142 is positioned, the first locking member 145 and the second locking member 146 are moved away from each other in the opposite direction by elastic force, and thereby, the locking members 144 may be fitted into and coupled to the restriction grooves 113 that are formed in the seating protrusion 116 and the coupling protrusion 122.

In addition, a supporting piece 148 may protrude on one surface of the cover member 142 where the locking member 144 is formed, and the supporting piece 148 supports the element 130, which is raised upward by the height adjustment handle 136, from a lower side.

That is, the element 130, which is raised by the height adjustment handle 136, is supported, thereby minimizing shaking of the element 130.

Figure 8:
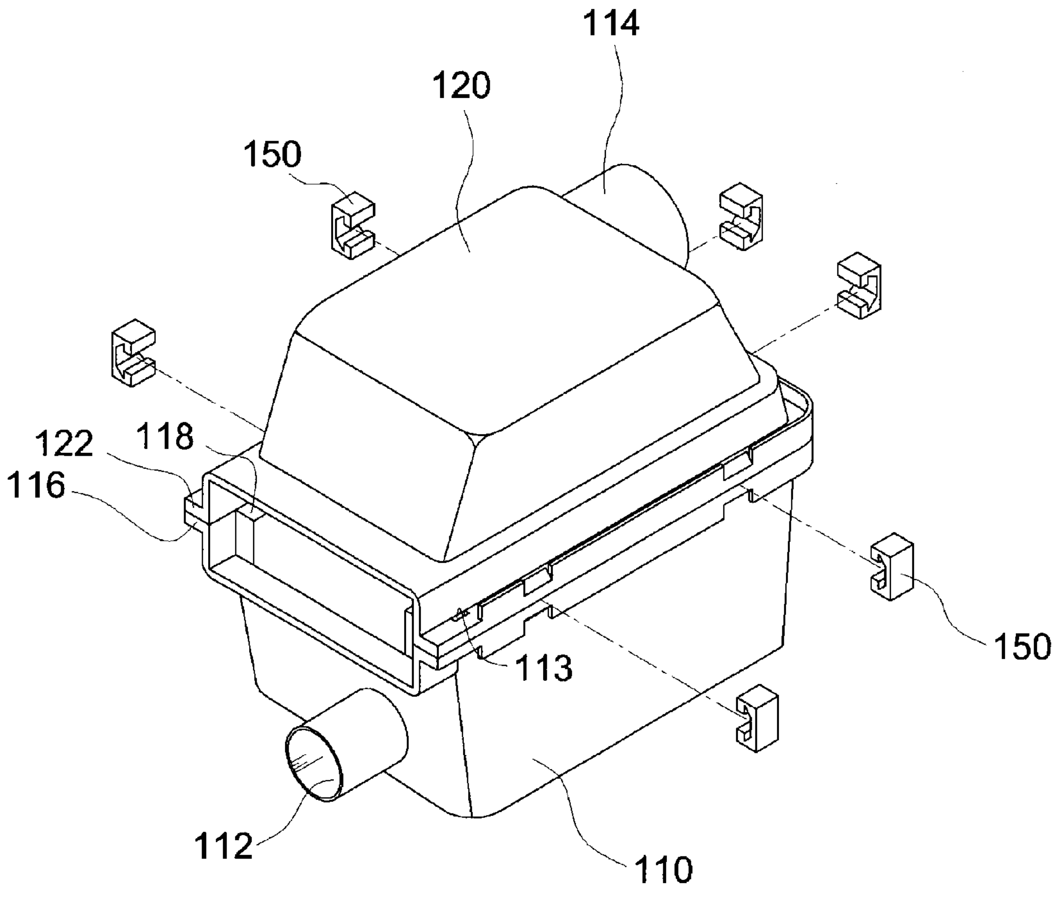
FIG. 8 is a view schematically illustrating a state in which a clamp used in the air cleaner for a vehicle according to the exemplary embodiment of the present disclosure is separated.

Meanwhile, as illustrated in FIG. 8, in the air cleaner 100 for a vehicle according to the exemplary embodiment of the present disclosure, the body portion 110 and the cover portion 120 may be engaged with each other by a plurality of clamps 150.

The clamp 150 is formed in a "⊂" shape, and stoppers are formed to protrude on both ends of the clamp 150 so as to face each other. A plurality of clamps 150 is made of a material having elastic force, and may be installed between the seating protrusion 116 and the coupling protrusion 122.

Therefore, according to the air cleaner for a vehicle according to the exemplary embodiment of the present disclosure, the body portion 110 and the cover portion 120 may be easily and conveniently coupled to each other. In addition, occurrence of vibrating noise may be minimized, and the element 130 may be conveniently replaced.

In the above description, the exemplary embodiments of the present disclosure has been described, but those having ordinary skill in the technical field to which the present disclosure pertains may variously modify and alter the present disclosure without departing from the spirit of the present disclosure disclosed in claims by adding, changing, and deleting constituent elements, and the modification and alteration also belong to the scope of the present disclosure.

What is claimed is:

1. An air cleaner for a vehicle, comprising:

a body portion which has an air inlet formed at one side of the body portion so as to suck air;

a cover portion which is coupled to an upper portion of the body portion and has an air outlet formed at one side of the cover portion;

an element which is inserted into or withdrawn from the interior of the body portion and the cover portion through a receiving opening that is formed at one side of the body portion and the cover portion, the element including a flange which is laterally extended;

a height adjustment handle which is coupled to a lower portion of the flange of the element so as to allow the element to be raised upward and lowered downward by a rotation of the height adjustment handle, wherein the height adjustment handle includes a shaft and a plurality of eccentric cams that are disposed in a longitudinal direction of the shaft, and each of the plurality of eccentric cams has a diameter larger than a diameter of the shaft, and has one side extended in one direction; and an element cover which prevents the element from being moved away from the receiving opening.

2. The air cleaner of claim 1, wherein the height adjustment handle is rotatably coupled to a plurality of fixing brackets that is formed at the lower portion of the flange of the element, and has a handle portion that is formed in a shaft shape and provided on one end of the height adjustment handle so that a user grips and rotates the handle portion, and the plurality of eccentric cams are installed on the shaft.

3. The air cleaner of claim 1, wherein the clement cover includes:

a cover member which is formed in a plate shape so as to completely cover an opened side of the receiving opening, the cover member having a front surface facing the opened side of the receiving opening; and locking members which is formed and protrude on both sides of the front surface of the cover member so as to be fixed and coupled to the body portion and the cover portion.

4. The air cleaner of claim 3, wherein the element cover further includes a supporting piece which is formed on the front surface on which the locking members are formed at both sides, and supports the element from a lower side.

5. The air cleaner of claim 3, wherein the locking members include:

a first locking member which protrudes on each of both sides of the front surface of the cover member, and has one end that is integrally formed with the cover member, and the other end that is bent upward;

a second locking member which has one end that is integrally formed with the cover member so as to be spaced apart from the first locking member at a predetermined distance, and the other end that is bent downward; and restriction protrusions which protrude on portions, which face each other, of the first locking member and the second locking member, which are integrally formed with the cover member, so that the restriction protrusions are fitted into and coupled to restriction grooves that are formed in the body portion and the cover portion, respectively.

6. The air cleaner of claim 1, further comprising supporting protrusions formed in the body portion along a rim disposed at an open upper end of the body portion, wherein the plurality of eccentric cams are disposed on the supporting protrusions.

7. An air cleaning unit for a vehicle air cleaner, comprising:

an element which is inserted into or withdrawn from an interior of the vehicle air cleaner through a receiving opening that is formed at one side of the vehicle air cleaner, the element including a rim member and a flange which is formed on an upper side of the rim member and is laterally extended; and a height adjustment handle which is coupled to a lower portion of the flange of the element so as to allow the element to be raised upward and lowered downward by a rotation of the height adjustment handle, wherein the height adjustment handle includes a shaft and a plurality of eccentric cams that are disposed in a longitudinal direction of the shaft, and each of the plurality of eccentric cams has a diameter larger than a diameter of the shaft, and has one side extended in one direction.

8. The air cleaning unit of claim 7, further comprising a plurality of fixing brackets formed at the lower portion of the flange of the element, wherein the height adjustment handle is rotatably coupled to the plurality of fixing brackets and has a handle portion that is formed in a shaft shape and provided on one end of the height adjustment handle so that a user grips and rotates the handle portion, and the plurality of eccentric cams are installed on the shaft.

* * * * *